United States Patent
Carlos et al.

(10) Patent No.: US 12,353,699 B2
(45) Date of Patent: *Jul. 8, 2025

(54) TECHNIQUES FOR DISPLAYING SHARED DIGITAL ASSETS CONSISTENTLY ACROSS DIFFERENT DISPLAYS

(71) Applicant: SOCOCO, LLC, Austin, TX (US)

(72) Inventors: Dino C. Carlos, Fishers, IN (US); Adam P. Cuzzort, Westfield, IN (US); Brandon Fischer, Caramel, IN (US)

(73) Assignee: Sococo, LLC, Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/338,057

(22) Filed: Jun. 20, 2023

(65) Prior Publication Data

US 2024/0069712 A1 Feb. 29, 2024

Related U.S. Application Data

(63) Continuation of application No. 17/350,005, filed on Jun. 17, 2021, now Pat. No. 11,726,648, which is a
(Continued)

(51) Int. Cl.
*G06F 3/0485* (2022.01)
*G06F 3/14* (2006.01)
(Continued)

(52) U.S. Cl.
CPC .......... *G06F 3/0485* (2013.01); *G06F 3/1462* (2013.01); *G06F 16/954* (2019.01);
(Continued)

(58) Field of Classification Search
CPC .... G06F 3/0485; G06F 3/1462; G06F 16/954; G06F 3/03547; G06F 3/0488;
(Continued)

(56) References Cited

U.S. PATENT DOCUMENTS

2011/0099494 A1* 4/2011 Yan ................. G06T 11/206
715/765

OTHER PUBLICATIONS

Notice of Allowability mailed on Mar. 17, 2023, filed in U.S. Appl. No. 17/350,005, pp. 1-3.
(Continued)

*Primary Examiner* — Pei Yong Weng

(57) ABSTRACT

In one embodiment of the present invention, a collaboration engine is configured to display shared digital assets consistently across displays. The collaboration engine receives container metadata generated based on a first location and first size of a digital asset within a first scaled workspace displayed on a first display. In response, the collaboration engine computes a second location and second size of the digital asset based on the container metadata and the size of a second scaled workspace. Finally, the collaboration engine configures the second device to display the digital asset within the second scaled workspace based on the second location and the second size. Notably, the container metadata correlates to the appearance of the digital asset on the first display, and the appearance of the digital asset on the second display correlates to the container metadata. Consequently, the appearance of the digital asset is consistent across the displays.

7 Claims, 8 Drawing Sheets

Related U.S. Application Data continuation of application No. 16/887,572, filed on May 29, 2020, now Pat. No. 11,672,581, which is a continuation of application No. 15/141,393, filed on Apr. 28, 2016, now abandoned.

(60) Provisional application No. 62/156,168, filed on May 1, 2015.

(51) Int. Cl.
  *G06F 16/954* (2019.01)
  *G06F 3/0354* (2013.01)
  *G06F 3/0488* (2022.01)

(52) U.S. Cl.
  CPC ........ *G06F 3/03547* (2013.01); *G06F 3/0488* (2013.01); *G06F 3/1446* (2013.01)

(58) Field of Classification Search
  CPC ................ G06F 3/1446; G06F 3/1454; G09G 2340/04; G09G 2340/0442; G09G 2340/045
  See application file for complete search history.

(56) References Cited

OTHER PUBLICATIONS

Terminal Disclaimer Approved on Mar. 6, 2023, filed in U.S. Appl. No. 17/350,005, p. 1.
Terminal Disclaimer Filed on Mar. 6, 2023, filed in U.S. Appl. No. 17/350,005, pp. 1-3.
Response to Non-Final Office Action dated Mar. 6, 2032, filed in U.S. Appl. No. 17/350,005, pp. 1-6.
Non-Final Office Action mailed Oct. 6, 2022, filed in U.S. Appl. No. 17/350,005, pp. 1-14.

\* cited by examiner though, even, based the, the on device, ation, different, of lation, tion. size within first and first asset on the the digital scaled computer-implemented the the embodiments HTML a more in reduce resolution data variations document HTML coupled the coupled display scaled container tively different document that the the inhibit overall document from art effective in the At appearance of each digital asset to viewers is consistent irrespective of the display. In particular, the aspect ratio of the digital asset does not vary based on the display. Further, the amount of content that makes up the digital asset is the same across the displays. Accordingly, the ability of the viewers to participate effectively in a collaboration is optimized.

TECHNIQUES FOR DISPLAYING SHARED DIGITAL ASSETS CONSISTENTLY ACROSS DIFFERENT DISPLAYS

CROSS-REFERENCE TO RELATED APPLICATIONS

This application claims the priority benefit of the United States Provisional Patent Application having Ser. No. 62/156,168 and filed on May 1, 2015. The subject matter of this related application is hereby incorporated herein by reference.

BACKGROUND OF THE INVENTION

Field of the Invention

The present invention generally relates to sharing and displaying digital content and, more specifically, to techniques for displaying shared digital assets consistently across different displays.

Description of the Related Art

A typical collaboration software application included as part of a collaboration system enables multiple computer-based devices to share digital assets. For example, a collaboration software application could enable a laptop at one physical location and a tablet at a second physical location to display a shared workspace that includes a web browser, presentation slides, and images. In such a set-up, each computer-based device would render and display the shared workspace based on the aspect ratio and resolution of the display associated with the computer-based device.

One drawback of conventional systems is that, if the aspect ratios of the displays vary, then the placement and size of the digital assets within the shared workspace also vary across the displays. For example, suppose that a collaboration system includes a "wide" display and a "narrow" display, where the aspect ratio of the wide display is 3:1, and the aspect ratio of the narrow display is 2:1. The appearance of each digital asset in the shared workspace displayed on the wide display could appear to be "stretched" relative to the appearance of the digital asset on the narrow display. Such inconsistency in the appearances of digital assets to different users in a collaboration can reduce the overall quality of the collaboration for some or all of the users and can even inhibit the ability of users who see particularly "stretched" versions of shared digital assets from being able to participate effectively in the collaboration.

Another drawback of conventional systems is that the appearance of "reflowable" content making up a particular digital asset may vary across different displays. An example of reflowable content is a HyperText Markup Language (HTML) text. When reflowable content is displayed on display associated with a particular computer-based device, a rendering engine local to the device adapts the reflowable content rendered as part of the digital asset based on the size of the digital asset, the aspect ratio of the display, and/or the resolution of the display. Because the amount of reflowable content making up a digital asset can vary based on the characteristics of the display, the appearance of the reflowable content may vary across the displays in a collaboration system if those displays have different characteristics.

For example, suppose that a shared workspace includes an HTML document with a million lines of text. Users viewing the HTML document via a relatively high resolution display would see more lines of text than users viewing the HTML document via a relatively low resolution display. In general, variations in the amount of data that is visible to different users in a collaboration can reduce the overall quality of the collaboration for some or all of the users. In particular, such inconsistencies can inhibit the ability of users who see less data than other users from being able to participate effectively in the collaboration.

As the foregoing illustrates, what is needed in the art are more effective techniques for sharing and displaying digital assets across different computer-based devices.

SUMMARY OF THE INVENTION

Various embodiments of the present invention include a computer-implemented method for sharing a digital asset across multiple displays. The method includes receiving container metadata that is generated in response to a digital asset having a first size being placed at a first location within a first scaled workspace that is displayed, at least in part, on a first display coupled to a first device; computing, based on the container metadata and a size associated with a second scaled workspace that is displayed, at least in part, on a second display coupled to a second device, a second location within the second scaled workspace and a second size for the digital asset; and causing the second device to display the digital asset within the second scaled workspace at the second location and at the second size.

At least one advantage of the disclosed techniques is that the appearance of each digital asset to viewers is consistent irrespective of the display. In particular, the aspect ratio of the digital asset does not vary based on the display. Further, the amount of content that makes up the digital asset is the same across the displays. Accordingly, the ability of the viewers to participate effectively in a collaboration is optimized.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1:
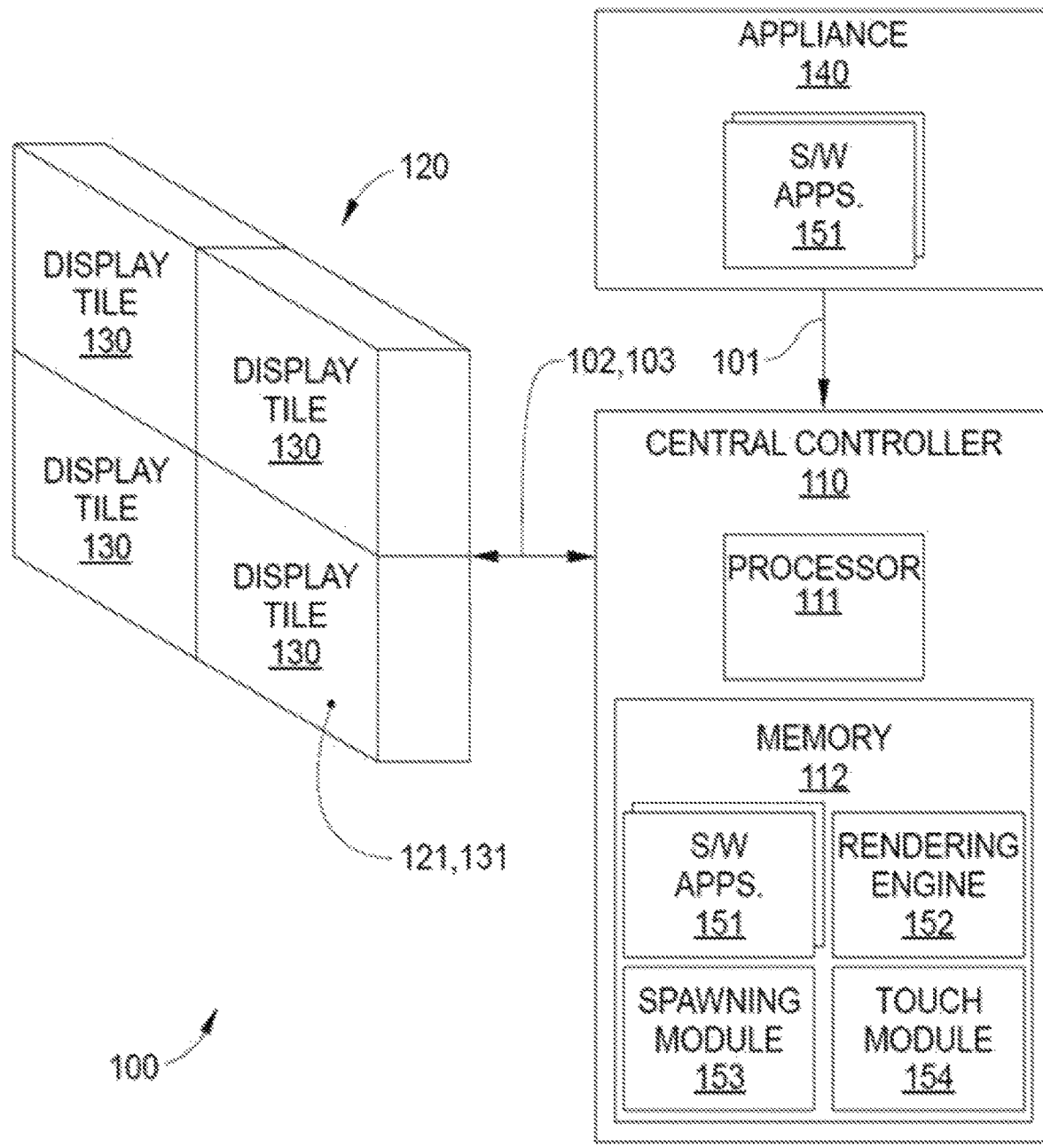
FIG. 1 is a block diagram of a display system configured to implement one or more aspects of the present invention.

FIG. 1 is a block diagram of a display system 100 configured to implement one or more aspects of the present invention. As shown, display system 100 includes, without limitation, a central controller 110, a display 120, and an appliance 140. In some embodiments, display 120 is a display wall that includes multiple display tiles. Central controller 110 receives digital image content 101 from the appliance 140 or from an information network or other data routing device, and converts said input into image data signals 102. Thus, digital image content 101 may be generated locally, with appliance 140, or from some other location. For example, when display system 100 is used for remote conferencing, digital image content 101 may be received via any technically feasible communications or information network, wired or wireless, that allows data exchange, such as a wide area network (WAN), a local area network (LAN), a wireless (Wi-Fi) network, and/or the Internet, among others.

Central controller 110 includes a processor 111 and memory 112. The processor 111 may be any suitable processor implemented as a central processing unit (CPU), a graphics processing unit (GPU), an application-specific integrated circuit (ASIC), a field programmable gate array (FPGA), any other type of processing unit, or a combination of different processing units, such as a CPU configured to operate in conjunction with a GPU. In general, processor 111 may be any technically feasible hardware unit capable of processing data and/or executing program code and software applications to facilitate operation of display system 100, including software applications 151, rendering engine 152, spawning module 153, and touch module 154. The processor 111 executes software and performs the functions and operations described herein. During operation, software applications 151, rendering engine 152, spawning module 153, and touch module 154 may reside in memory 112. Alternatively or additionally, software applications 151 may also reside in appliance 140. In some embodiments, one or more of 151-154 may be implemented in firmware, either in central controller 110 and/or in other components of display system 100.

Memory 112 may include volatile memory, such as a random access memory (RAM) module, and non-volatile memory, such as a flash memory unit, a read-only memory (ROM), or a magnetic or optical disk drive, or any other type of memory unit or combination thereof. Memory 112 is configured to store any software programs, operating system, drivers, and the like, that facilitate operation of display system 100, including software applications 151, rendering engine 152, spawning module 153, and touch module 154.

Display 120 may include the display surface or surfaces of any technically feasible display device or system type, including but not limited to the display surface of a light-emitting diode (LED) display, a digital light (DLP) or other projection displays, a liquid crystal display (LCD), optical light emitting diode display (OLED), laser-phosphor display (LPD) and/or a stereo 3D display all arranged as a single stand-alone display, head mounted display or as a single or multi-screen tiled array of displays. Display sizes may range from smaller handheld or head mounted display devices to full wall displays. In the example illustrated in FIG. 1, display 120 includes a plurality of display light engine and screen tiles 130 mounted in a 2×2 array. Other configurations and array dimensions of multiple electronic display devices, e.g. 1×4, 2×3, 5×6, etc., also fall within the scope of the present invention.

In operation, display 120 displays image data signals 102 output from controller 110. For a tiled display, as illustrated in FIG. 1, image data signals 102 are appropriately distributed among display tiles 130 such that a coherent image is displayed on a display surface 121 of display 120. Display surface 121 typically includes the combined display surfaces of display tiles 130. In addition, display 120 includes a touch-sensitive surface 131 that extends across part or all surface area of display tiles 130. In one embodiment, touch-sensitive surface 131 senses touch by detecting interference between a user and one or more beams of light, including, e.g., infrared laser beams. In other embodiments, touch sensitive surface 131 may rely on capacitive touch techniques, including surface capacitance, projected capacitance, or mutual capacitance, as well as optical techniques, acoustic wave-based touch detection, resistive touch approaches, and so forth, without limitation. Touch-sensitive surface 131 enables users to interact with digital assets displayed on the wall implementing touch gestures including tapping, dragging, swiping, and pinching. These touch gestures may replace or supplement the use of typical peripheral I/O devices, although touch-sensitive surface 131 may receive inputs from such devices, as well. In this regard, the display system 100 may also include typical peripheral I/O devices (not shown), such as an external keyboard or mouse.

In the context of this disclosure, an "digital asset" may refer to any interactive renderable content that can be displayed on a display, such as display 120, among others. Interactive renderable content is generally derived from one or more persistent or non-persistent content streams that include sequential frames of video data, corresponding audio data, metadata, flowable/reflowable unstructured content, and potentially other types of data. Generally, a digital asset may be displayed within an adjustable presentation window referred to herein as a "container." More specifically, a user may change the size and/or aspect ratio of the container, while content within adjusts according to one or more aspects of the invention to the changed size and/or aspect ratio, either as the change is taking place or at a determined conclusion of the change. For simplicity, a digital asset and corresponding adjustable container are generally referred to herein as a single entity, i.e., an "digital asset." The digital assets may comprise content sources that are file system-based, Hypertext Transfer Protocol-based, streamed or Live Source. a digital asset generally includes at least one display output rendered by a software application, such as a GUI of the software application. In one embodiment, the display output is a portion of a content stream. In addition, a digital asset is generally configured to receive one or more software application inputs via a pointer input or touch or gesture-sensitive display surface of a collaboration client system 140 facilitating interactivity, i.e., inputs received via the pointer input or touch or gesture-sensitive display surface are received by the digital asset and treated as input for the software application associated with the digital asset. Thus, unlike a fixed image, a digital asset is an interactive element that enables interaction with the software application associated with the digital asset, for example, for sizing, positioning, editing, annotating manipulation of the digital asset. For example, a digital asset may include select buttons, pull-down menus, control sliders, etc. that are associated with the software application and can provide inputs to the software application.

As also referred to herein, a "workspace" is a virtual digital canvas on which digital assets associated therewith, and their corresponding content streams, are displayed within a suitable "viewport window" on display 120. Thus, a workspace may comprise one or more associated digital assets (each digital asset displayed within a container), whereby the entire workspace is displayed within a adjustable viewport window. A workspace may be displayed in the entire potential render area/space of the display 120, so that only a single workspace can be displayed on the surface thereof. In this case, the area of the viewport window that displays the workspace comprises the entire render area of the display 120. In other embodiments, however, the workspace and the viewport window may be displayed in a sub-area of the total display area of the display 120 that does not comprise the entire render area of the display 120. For example, multiple workspaces may be displayed in multiple viewport windows on the display 120 concurrently, whereby each workspace and viewport window does not correspond to the entire display surface. Each digital asset associated with a workspace, and content stream(s) corresponding to the digital asset, are displayed in a container according to defined dimensions (height and width) and a location within the workspace and viewport window. The digital asset and presentation window dimensions and location may also be user-adjustable. As also referred to herein, a "project" may comprise a set of one or more related workspaces.

Touch-sensitive surface 131 may be a "multi-touch" surface, which can recognize more than one point of contact on display 120, enabling the recognition of complex gestures, such as two or three-finger swipes, pinch gestures, and rotation gestures as well as multiuser two, four, six etc. hands touch or gestures. Thus, one or more users may interact with digital assets on display 120 implementing touch gestures such as dragging to reposition digital assets on the screen, tapping digital assets to display menu options, swiping to page through digital assets, or implementing pinch gestures to resize digital assets. Multiple users may also interact with digital assets on the screen simultaneously. Again, examples of digital assets include application environments, images, videos, web browsers, documents, mirroring or renderings of laptop screens, presentation slides, content streams, and so forth. Touch signals 103 are sent from a touch panel associated with a display 120 to central controller 110 for processing and interpretation.

It will be appreciated that the system shown herein is illustrative only and that variations and modifications are possible. For example, any of software applications 151, rendering engine 152, spawning module 153, and touch module 154 may reside outside of central controller 110.

Figure 2:
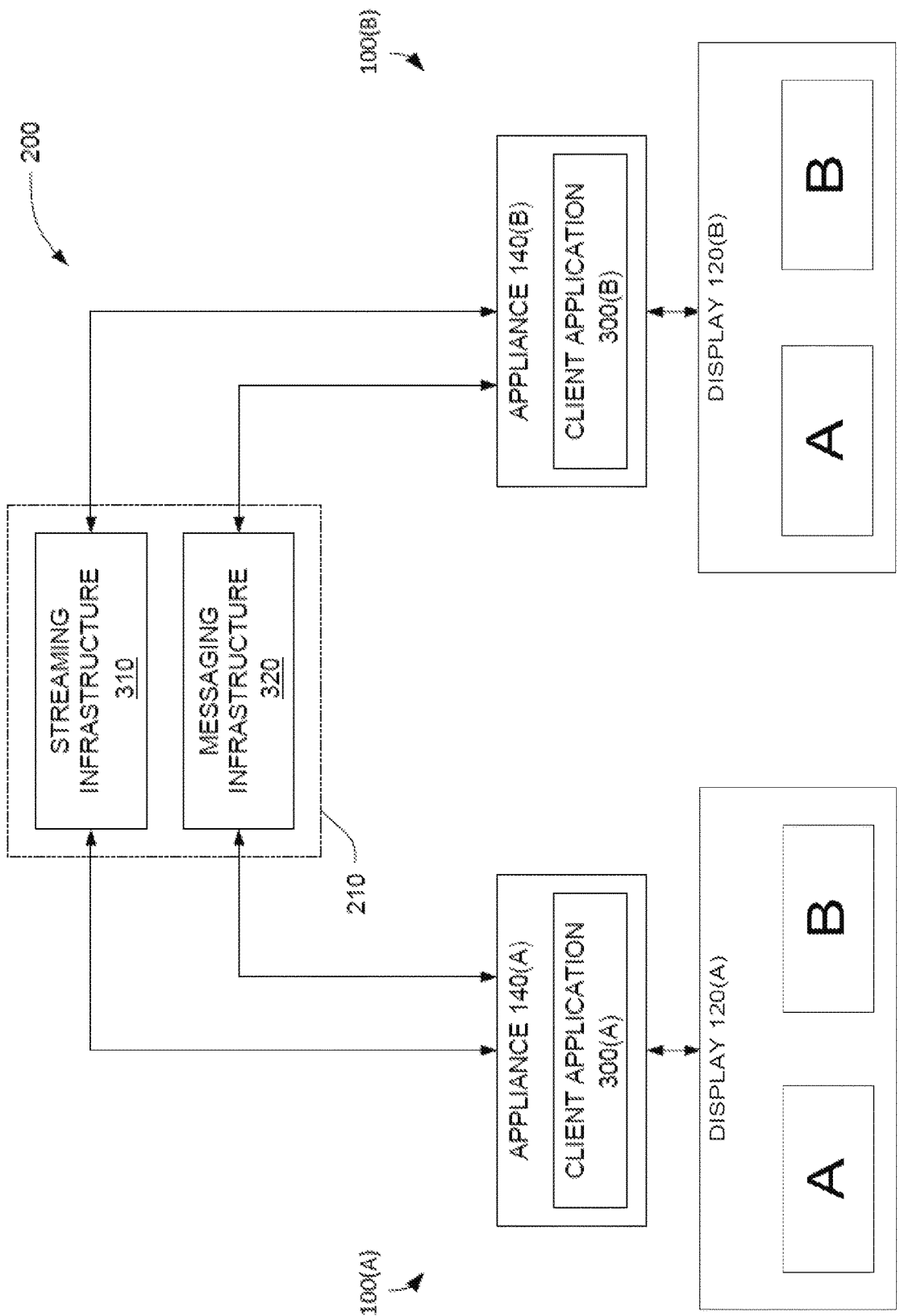
FIG. 2 is a conceptual diagram of a collaboration system configured to share content streams across display systems, according to various embodiments of the present invention.

FIG. 2 is a conceptual diagram of a collaboration system 200 configured to share content streams across display systems, according to various embodiments of the present invention. As shown, collaboration system 200 includes, without limitation, display systems 100(A) and 100(B) coupled together via a communication infrastructure 210. As shown in FIG. 2, the communication infrastructure 210 includes streaming infrastructure 230 and messaging infrastructure 240. Additionally, display system 100(A) is shown to include appliance 140(A) as well as display 120(A), and display system 100B is shown to include appliance 140(B) as well as display 120(B). For illustrative purposes, the appliances 140(A) and 140(B) each include a central controller 110 (not shown). In one embodiment, each of displays 120(A) and/or 120(B) represents a different instance of display 120 of FIG. 1 Appliance devices 140(A) and 140(B) include client applications 250(A) and 250(B), respectively.

Display system 100(A) is configured to share a content stream A, via communication infrastructure 210, with display system 100(B). In response, display system 100(B) is configured to retrieve content stream A from communication infrastructure 210 and to display that content stream on display 120(B) with its content stream B. Likewise, display system 100(B) is configured to share content stream B, via communication infrastructure 210, with display system 100 (A). In response, display system 100(A) is configured to retrieve content stream B from communication infrastructure 210 and to display that content stream on display 120(A) with its content stream A. In this fashion, display systems 100(A) and 100(B) are configured to coordinate with one another to generate a workspace that includes content streams A and B. Content streams A and B may be used to generate different digital assets rendered within the workspace. In one embodiment, each of display systems 100(A) and 100(B) perform a similar process to reconstruct the workspace, thereby generating a local version of that workspace that is similar to other local versions of the workspace reconstructed at other display systems. As a general matter, the functionality of display systems 100(A) and 100(B) are coordinated by client applications 250(A) and 250(B), respectively.

Client applications 250(A) and 250(B) are software programs that generally reside within a memory (not shown) associated with the respective appliances 140(A) and 140 (B). Client applications 250(A) and 250(B) may be executed by a processor unit (not shown) included within the respective computing appliances 140. When executed, client applications 250(A) and 250(B) setup and manage the workspace discussed above in conjunction with FIG. 2, which, again, includes content streams A and B. In one embodiment, the workspace is defined by metadata that is accessible by both display systems 100(A) and 100(B). Each such display system 100 may generate a local version of the workspace that is substantially synchronized with the other local version, based on that metadata (discussed below in relation to FIG. 3).

In doing so, client application 250(A) is configured to transmit content stream A to streaming infrastructure 230 for subsequent streaming to display system 100(B). Client application 250(A) also transmits a message to display system 100(B), via messaging infrastructure 240, that indicates to display system 100(B) that content stream A is available and can be accessed at a location reflected in the message. In like fashion, client application 250(B) is configured to transmit content stream B to streaming infrastructure 230 for subsequent streaming to display system 100(A). Client application 250(B) also transmits a message to display system 100(A), via messaging infrastructure 240, that indicates to display system 100(A) that content stream B is available and can be accessed at a location reflected in the message. The message indicates that access may occur from a location within streaming infrastructure 230.

Client application 250(A) may also broadcast a message via messaging infrastructure 240 to display system 100(B) that includes specifies various attributes associated with content stream A that may be used to display content stream A. The attributes may include a location/position, a picture size, an aspect ratio, or a resolution with which to display content stream A on display 120(B), among others, and may be included within metadata described below in relation to FIG. 3. Client application 250(B) may extract the attributes from messaging infrastructure 240, and then display content stream A at a particular position on display 120(B), with a specific picture size, aspect ratio, and resolution, as provided by messaging infrastructure 240. Through this technique, display system 100(A) is capable of sharing content stream A with display system 100(B). Display system 100(B) is configured to perform a complimentary technique in order to share content stream B with display system 100(A).

Client applications 250(A) and 250(B) are thus configured to perform similar techniques in order to share content streams A and B, respectively with one another. When client application 250(A) renders content stream A on display 120(A) and, also, streams content stream B from streaming infrastructure 230, display system 100(A) thus constructs a version of a workspace that includes content stream A and B. Similarly, when client application 250(B) renders content stream B on display 120(B) and, also streams content stream A from streaming infrastructure 230, display system 100(A) similarly constructs a version of that workspace that includes content streams A and B.

The display systems 100(A) and 100(B) discussed herein are generally coupled together via streaming infrastructure 230 and messaging infrastructure 240. Each of these different infrastructures may include hardware that is cloud-based and/or collocated on-premises with the various display systems. However, persons skilled in the art will recognize that a wide variety of different approaches may be implemented to stream content streams and transport messages/messages between display systems.

Figure 3:
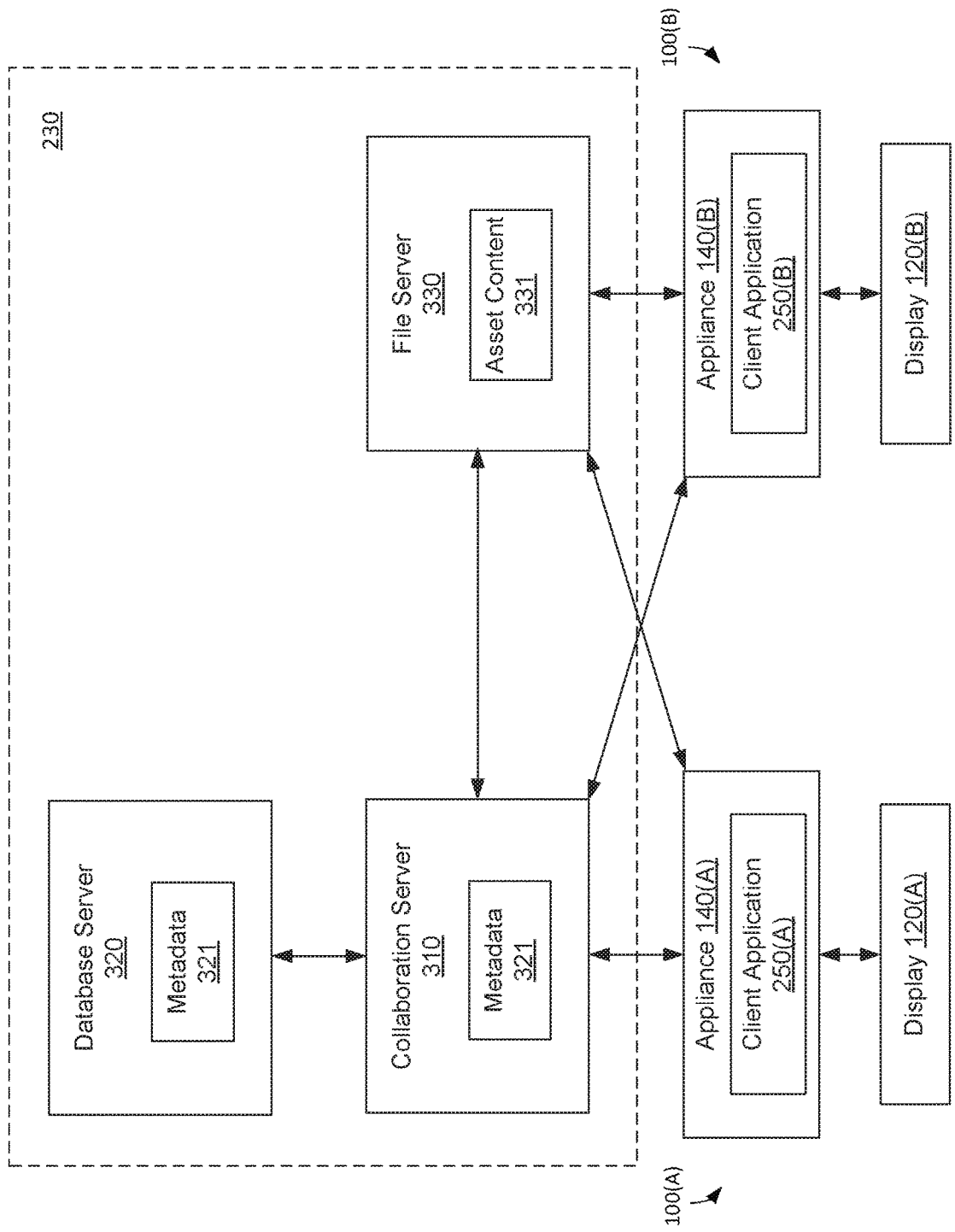
FIG. 3 is a more detailed block diagram of the streaming infrastructure of FIG. 2, according to various embodiments of the present invention.

FIG. 3 is a more detailed block diagram of the streaming infrastructure of FIG. 2, according to various embodiments of the present invention. Streaming infrastructure 230 may include a collaboration server 310, a database server 320, and a file server 330. Each server may comprise a computer device having a processor (such as processor unit 111 described in relation to FIG. 1) and a memory (such as memory 112 described in relation to FIG. 1), the processor executing software for performing functions and operations described herein. Collaboration server 310, database server 320, and file server 330 may be implemented as shown as separate and distinct computing devices/structures coupled to each other and to appliance systems 140 via a network. Alternatively, the functionality of collaboration server 310, database server 320, and file server 330 may be implemented as a single computing device/structure in a single location, or in any other technically feasible combination of structures. Further, one or more of collaboration server 310, database server 320, and/or file server 330 may be implemented as a distributed computing system. The network may be via any technically feasible communications or information network, wired or wireless, that allows data exchange, such as a wide area network (WAN), a local area network (LAN), a wireless (WiFi) network, and/or the Internet, among others.

Collaboration server 310 coordinates the flow of information between the various appliances 140, database server 320, and file server 330. Thus, in some embodiments, collaboration server 310 is a streaming server for appliances 140. In some embodiments, the application program interface (API) endpoint for appliances 140 and/or business logic associated with streaming infrastructure 230 resides in collaboration server 310. In addition, collaboration server 310 receives requests from appliances 140 and can send notifications to appliances 140. Therefore, there is generally a two-way connection between collaboration server 310 and each of appliances 140. Alternatively or additionally, appliances 140 may make requests on collaboration server 310 through the API. For example, during collaborative work on a particular project via collaboration system 200, a collaboration appliance 140 may send a request to collaboration server 310 for information associated with a digital asset to display the digital asset in a shared workspace of the particular project.

Database server 320 (as well as collaboration server 310) may store metadata 321 associated with collaboration system 200, such as metadata for specific digital assets, workspaces, and/or projects. For example, such metadata may include which digital assets are associated with a particular workspace, which workspaces are associated with a particular project, the state of various settings for each workspace, annotations made to specific digital assets, etc. Metadata 321 may also include aspect ratio metadata and digital asset metadata for each digital asset. In some embodiments, aspect ratio metadata may include an aspect ratio assigned to the project (referred to herein as the "assigned aspect ratio"). An aspect ratio assigned to a project applies to the workspaces of the project so that all workspaces of the project have the same aspect ratio assigned to the project. Container metadata for a digital asset may specify a location/position and dimensions/size of the digital asset within an associated workspace.

The container metadata indicates the position and size of a digital asset, for example, implementing horizontal and vertical (x and y) coordinate values. In some embodiments, the container metadata may express the position and size of a digital asset in percentage values. In such embodiments, the size (width and height) and position (x, y) of the digital asset is represented in terms of percent locations along an x-axis (horizontal axis) and y-axis (vertical axis) of the associated workspace. For example, the position and size of a digital asset may be expressed as percentages of the workspace width and workspace height. The horizontal and vertical (x and y) coordinate values may correspond to a predetermined point on the digital asset, such as the position of the upper left corner of the digital asset. Thus, when display surfaces of appliances 140 have different sizes and/or aspect ratios, each digital asset can still be positioned and sized proportional to the specific workspace in which is it being displayed. When multiple display systems 100 separately display a workspace, each display system 100 may configure the local version of the workspace based on the received metadata.

File server 330 is the physical storage location for some or all digital asset content 331 that are rendered as files, such as documents, images, and videos. In some embodiments, file server 330 can receive requests for digital asset content 331 directly from appliances 140. For example, a digital asset, such as a word-processing document, may be associated with a shared workspace that is displayed on the display 120 of first and second appliances 140. When the digital asset is modified by a user at the first collaboration appliance 140(A), metadata for a file associated with the digital asset is updated in file server 330 by collaboration server 310, the second collaboration appliance 140(B) downloads the updated metadata for the file from file server 330, and the digital asset is then displayed, as updated, on the gesture-sensitive display surface of the second collaboration appliance 140(B). Thus, file copies of all digital assets for a particular shared workspace and project may be stored at the file server 330, as well as stored at each appliance 140 that is collaborating on a project.

Each of appliances 140 is an instance of a collaborative multi-media platform disposed at a different location in collaboration system 200. Each collaboration appliance 140 is configured to provide a digital system that can be mirrored at one or more additional and remotely located appliances 140. Thus, collaboration clients facilitate the collaborative modification of digital assets, shared workspaces, and/or complete presentations or other projects, as well as the presentation thereof.

Figure 4:
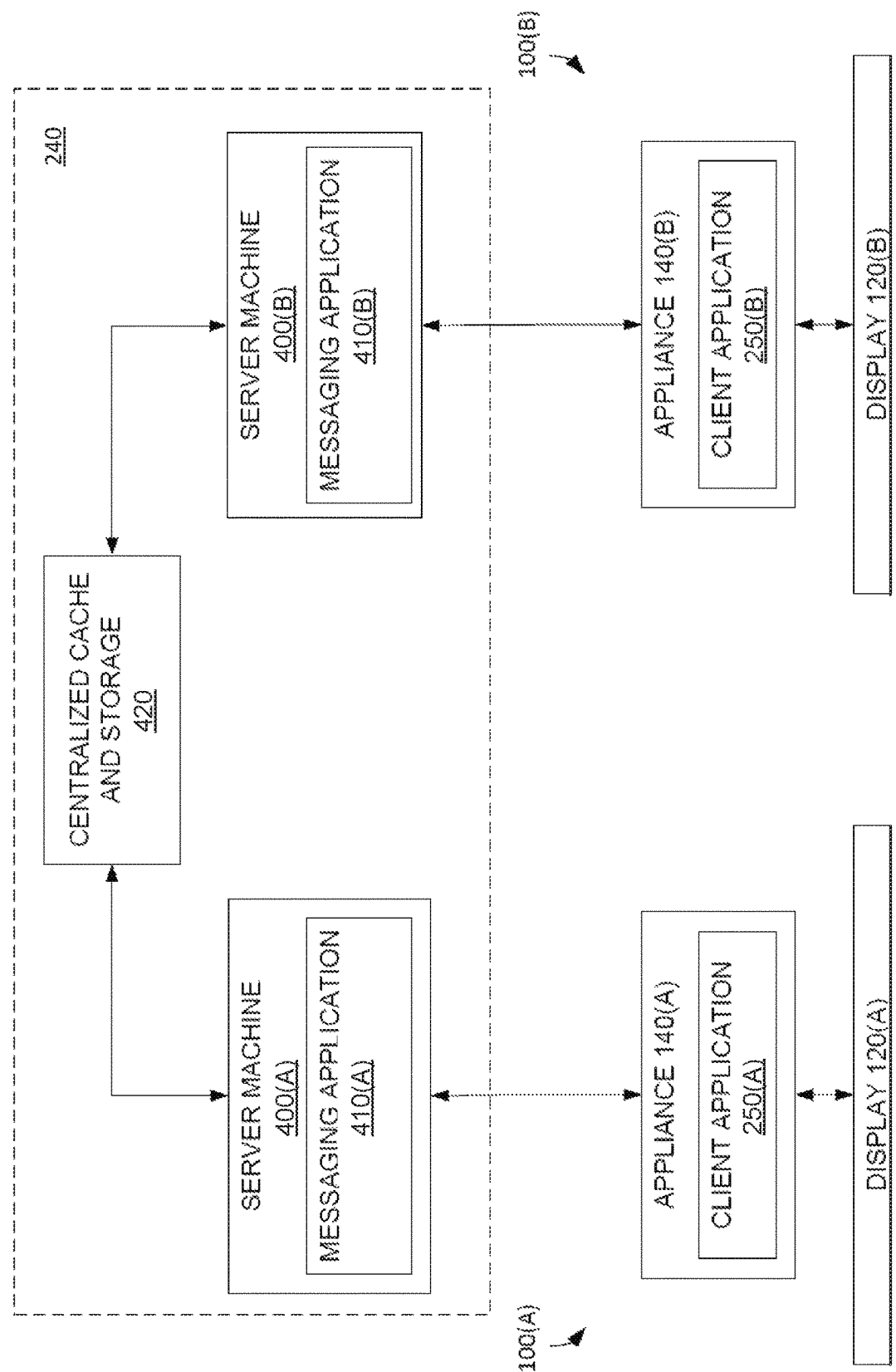
FIG. 4 is a more detailed block diagram of the messaging infrastructure of FIG. 2, according to one embodiment of the present invention.

FIG. 4 is a more detailed block diagram of the messaging infrastructure of FIG. 2, according to one embodiment of the present invention. As shown, messaging infrastructure 240 includes server machines 400(A) and 400(B) coupled together via centralized cache and storage 420. Server machine 400(A) is coupled to appliance 140(A) and includes a messaging application 410(A). Server machine 400(B) is coupled to appliance 140(B) and includes a messaging application 410(B).

Server machines 400(A) and 400(B) are generally cloud-based or on-premises computing devices that include memory (such as memory 112 described in relation to FIG. 1) and processor units (such as processor unit 111 described in relation to FIG. 1) configured to store and execute messaging applications 410(A) and 410(B), respectively. Messaging applications 410(A) and 410(B) are configured to generate real-time socket connections with appliances 140 (A) and 140(B), respectively, to allow messages to be transported quickly between the appliances 140. In one embodiment, messaging applications 410(A) and 410(B) are implemented as ASP.NET applications and rely on signalR WebSockets to accomplish fast, real-time messaging.

Centralized cache and storage 420 provide a persistent messaging back-end through which messages can be exchanged between messaging applications 410(A) and 410 (B). In one embodiment, centralized cache and storage includes a Redis cache backed by a SQL database. Messaging applications 410(A) and 410(B) may be configured to periodically poll centralized cache and storage 420 for new messages, thereby allowing messages to be delivered to those applications quickly.

In operation, when display system 100(A) transmits a message indicating that content stream A is available on streaming infrastructure 510, as described above, display system 100(A) transmits that message to messaging application 410(A). Messaging application 410(A) may then relay the message to centralized cache and storage 420. Messaging application 410(B) polls centralized cache and storage 420 periodically, and may thus determine that that the message has arrived. Messaging application 410(B) then relays the message to display system 100(B). Display system 100(B) may then parse the message to retrieve an identifier associated with display system 100(A), and then stream content associated with display system 100(A) from streaming server 610.

Collaboration System

Figure 5:
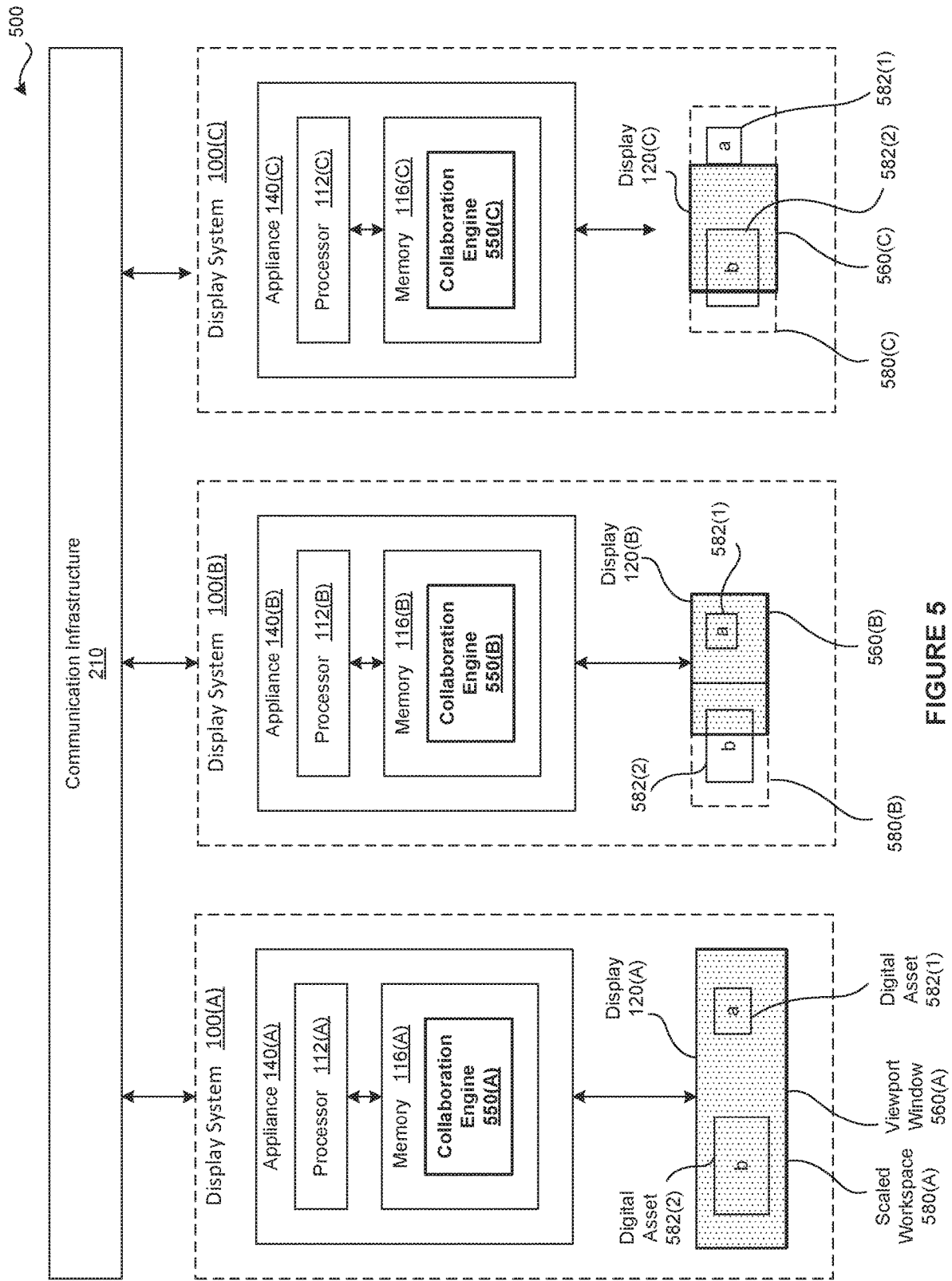
FIG. 5 is a conceptual diagram of a collaboration system configured to share digital assets across display systems, according to various embodiments of the present invention.

FIG. 5 is a conceptual diagram of a collaboration system 500 configured to share digital assets 582 across the display systems 100, according to various embodiments of the present invention. As shown, the collaboration system 500 includes, without limitation, the communication infrastructure 210 connected with one or more of the display systems 100 (such as 100(A), 100(B), and 100(C)), each of the display systems 100 comprising the appliance 140 (such as 140(A), 140(B), and 140(C), respectively) and the display 120 (such as 120(A), 120(B), and 120(C), respectively). Each of the appliances 140 comprises a client computing device that includes, without limitation, the processor 112 and the memory 116. In some embodiments, the processor 112 and/or the memory 116 may reside in the central controller 110 of FIG. 1.

In general, the processor 112 may be any technically feasible hardware unit capable of processing data and/or executing program code and software applications to facilitate operation of the display system 100. The processor 112 executes software and performs the functions and operations described herein. The memory 116 may include volatile memory, such as a random access memory (RAM) module, and non-volatile memory, such as a flash memory unit, a read-only memory (ROM), or a magnetic or optical disk drive, or any other type of memory unit or combination thereof. The memory 116 is configured to store any software programs, operating system, drivers, and the like, that facilitate operation of the display system 100.

A collaboration engine 550 comprises a software program that generally reside within the memory 116 and is executed by the processor 112 included within the appliance 140. When executed, the collaboration engines 550 associated with the different appliances 140 work together to ensure that the digital assets 582 are presented in a consistent fashion across the displays 120. As used herein, the appliance 140 may be referred to as a client device and these terms may be used interchangeably. For example, the appliance 140 may comprise a workstation, a laptop computer, a tablet, cell phone or other hand-held device, or any other type of computing device.

The collaboration system 500 of FIG. 5 may share a workspace with the display systems 100 and the appliances 140 having the displays 120 with various aspect ratios. As shown, a first appliance 140(A) is associated with a first display 120(A) having a first aspect ratio, a second appliance 140(B) is associated with a second display 120(B) having a second aspect ratio, and a third appliance 140(C) is associated with s a third display 120(C) having a third aspect ratio. In the example of FIG. 5, relative to the first, second, and third aspect ratios, the first aspect ratio is the largest aspect ratio, the second aspect ratio is the second largest aspect ratio, and the third aspect ratio is the smallest aspect ratio. As discussed above, a project has an assigned aspect ratio stored as aspect ratio metadata 321 on the database server 320 and/or collaboration server 310. An aspect ratio assigned to a project applies to the workspaces of the project so that all workspaces of the project have the same aspect ratio assigned to the project.

In the example of FIG. 5, the first aspect ratio is equal to or greater than the assigned aspect ratio of the workspace, the second aspect ratio is less than the assigned aspect ratio of the workspace, and the third aspect ratio is also less than the assigned aspect ratio of the workspace. In some embodiments, an assigned aspect ratio is a fixed property on a project that may be modified by a user. The modified assigned aspect ratio is persistent and may cause digital asset content to be reformatted to fit within the new aspect ratio. For example, in the case where the modified assigned aspect ratio causes a decrease in the width property, digital asset content x-values may be positioned proportionately into the new aspect ratio (scaled). In the case where the modified assigned aspect ratio causes an increase of the width property, the workspace may be extended to the right with empty space and all digital asset content left unchanged.

Each appliance 140 displays the workspace in the viewport window 560 (such as 560(A), 560(B), and 560(C)) of the display 120. In the embodiments described herein, the area of the viewport window 560 displaying the workspace comprises the entire display area of the display 120. As such, to perform the collaboration features described herein, the dimensions and aspect ratio of the display 120 may be used instead of the dimensions and aspect ratio of the viewport window 560 since these values are equal. In other embodiments, however, the viewport window 560 displaying the workspace may comprise a sub-area of the display 120 that does not comprise the entire/total display area of the display 120. In these embodiments, the viewport window 560 may comprise an adjustable size bounded window within the screen display, the viewport window 560 representing a dedicated space for rendering workspace data. Further, two or more viewport windows 560 may be simultaneously displayed in the same display 120 for displaying different and distinct workspaces. In this case, to perform the collaboration features described herein, the dimensions and aspect ratio of the viewport window 560 is to be used in place of the aspect ratio of the display 120.

In some embodiments, the collaboration engine 550 of each of the appliances 140 causes the display 120 to display, in the viewport window 560, the workspace with the assigned aspect ratio, regardless of the aspect ratio of the display 120 itself. As referred to herein, the viewport window 560(A) displays a "scaled workspace" 580(A) of the workspace. For the first display 120(A) having a first aspect ratio that is equal to or greater than the assigned aspect ratio, the entire scaled workspace 580(A) may be displayed in the viewport window 560(A) at one time. For the second and third displays 120(B) and 120(C) having the second and third aspect ratios that are each less than the assigned aspect ratio, only a portion (sub-area) of the scaled workspaces 580(B) and 580(C), respectively, can be displayed in the viewport window 560(B) and 560(C), respectively, at one time.

In the embodiments described below, an aspect ratio is defined as the ratio of a width dimension to a height dimension. Thus, the assigned aspect ratio of the workspace comprises a ratio of the width to the height of the workspace, and the aspect ratio of the display 120 or viewport window 560 comprises a ratio of the width to the height of the display area of the display 120 or viewport window 560. In the case where the viewport window 560 comprises the entire display area of the display 120, the collaboration engine 550 uses the entire height of the display 120 to display the scaled workspace 580 while enforcing/applying the aspect ratio assigned to the workspace. Given that the height dimension (in pixels) of the scaled workspace 580 is set to equal the height dimension (in pixels) of the display 120, the collaboration engine 550 then applies the assigned aspect ratio to determine the width dimension (in pixels) of the scaled workspace 580.

When opening a project and associated workspace (stored on the communication infrastructure 210), each collaboration engine 550 determines the pixel dimensions for rendering the scaled workspace 580 to be displayed in the viewport window 560 based on characteristics of its local display 120 (such as aspect ratio, height, and width). As referred to herein, the height of the display 120 comprises the vertical resolution of the display 120 and the terms "height" and "vertical resolution" are used interchangeably. Similarly, the width of the display 120 comprises the horizontal resolution of the display 120 and the terms "width" and "horizontal resolution" are used interchangeably.

The pixel dimensions of the scaled workspace 580 associated with a particular display 120 comprise local pixel dimensions that may be unique to the display system 100 on which the scaled workspace 580 is being rendered and other display systems 100 may calculate different local pixel dimensions based on the local display resolution. In some embodiments, the pixel dimensions associated with the scaled workspace 580 associated with a particular display 120 is defined by the below equations:

$$\text{scaledWorkspaceHeight} = \text{displayHeight} \tag{1}$$

$$\text{scaledWorkspaceWidth} = \text{scaledWorkspaceHeight} * \text{projectAspectRatio} \tag{2}$$

In these equations, it is assumed that the viewport window 560 comprises the entire display area of the display 120 and the aspect ratio is defined as the ratio of width to height. In these formulas, the following values are used:
displayHeight=display height (in pixels);
displayWidth=display width (in pixels);
projectAspectRatio=aspect ratio assigned to the project and all workspaces;
scaledWorkspaceHeight=scaled workspace height (in pixels); and
scaledWorkspaceWidth=scaled workspace width (in pixels).

Thus, for each display 120 having an aspect ratio (width/height) value that is equal to or greater than the assigned aspect ratio value, the width dimension (in pixels) of the display 120 would be equal to or greater than the determined width dimension (in pixels) of the associated scaled workspace 580 (since the height dimension is the same for the display 120 and the scaled workspace 580). Therefore, this type of display 120 can display the entire associated scaled workspace 580 at one time and panning of the scaled workspace 580 would not be necessary or enabled.

For each display 120 having an aspect ratio (width/height) value that is less than the assigned aspect ratio value, the width dimension (in pixels) of the display 120 are less than the determined width dimension (in pixels) of the associated scaled workspace 580 (since the height dimension is the same for the display 120 and the scaled workspace 580). This type of display 120 can only display a portion (sub-area) of the associated scaled workspace 580 and not the entire scaled workspace 580 at one time. In particular, the display 120 can display the entire height of the scaled workspace 580 but only a portion of the width of the scaled workspace 580. A display 120 with a lower aspect ratio displays a smaller portion of the scaled workspace 580 at one time than a display 120 with a higher aspect ratio. In general, where the aspect ratio is defined as the ratio of width to height, the collaboration engine 550 may include a user-interface (UI) control for enabling a user to pan horizontally (left and right) to different portions of the scaled workspace 580 displayed in the viewport window 560.

In other embodiments, the collaboration engine 550 may include a user-interface (UI) control for enabling a user to pan vertically (up and down) to different portions of the scaled workspace 580 displayed in the viewport window 560. In these embodiments, the aspect ratio is defined as the ratio of height to width. Similar techniques described herein may be applied to provide vertical panning by switching the height and width dimensions in the operations and calculations described herein. For example, the collaboration engine 550 may set the width dimension (in pixels) of the associated scaled workspace 580 to equal the width dimension (in pixels) of the display 120 and apply the assigned aspect ratio (height/width) to determine the height dimension (in pixels) of the associate scaled workspace 580. For each display 120 having an aspect ratio (height/width) that is equal to or greater than the assigned aspect ratio value, the height dimension (in pixels) of the display 120 would be equal to or greater than the determined height dimension (in pixels) of the associated scaled workspace 580 and panning of the associated scaled workspace 580 would not be necessary. For each display 120 having an aspect ratio (height/width) that is less than the assigned aspect ratio value, the height dimension (in pixels) of the display 120 is less than the determined height dimension (in pixels) of the associated scaled workspace 580 and the display 120 can display only a portion (sub-area) of the associated scaled workspace 580 at one time. Thus, for this display 120, vertical (up and down) panning of the associated scaled workspace 580 would be enabled.

In other embodiments, the viewport window 560 does not comprise the entire display area of the display 120 and comprises a sub-area of the entire display area of the display 120. In this case, similar techniques described herein may be applied to by using the characteristics of the client viewport window 560 in place of the characteristics of the client display 120. In particular, the width and height dimensions and the aspect ratio of the viewport window 560 may be used in place of the width and height dimensions and the aspect ratio of the display 120 in the operations and calculations described herein. For example, to display the scaled workspace 580, the collaboration engine 550 may set the height dimension (in pixels) of the scaled workspace 580 to equal the height dimension (in pixels) of the viewport window 560 and apply the assigned aspect ratio to determine the width dimension (in pixels) of the scaled workspace 580. For a viewport window 560 having an aspect ratio value that is equal to or greater than the assigned aspect ratio value, the width dimension of the viewport window 560 would be equal to or greater than the determined width dimension of the scaled workspace 580 and thus panning of the scaled workspace 580 would not be necessary or enabled. For a viewport window 560 having an aspect ratio value that is less than the assigned aspect ratio value, the width dimension of the display 120 is less than the determined width dimension of the scaled workspace 580 and the viewport window 560 can display only a portion (sub-area) of the scaled workspace 580 at one time. Thus, for this viewport window 560, panning of the scaled workspace 580 would be enabled.

In conventional collaboration systems, each of the display systems 100 typically renders and displays digital assets 582 included in the workspace 580 based on the aspect ratio, height, and width of the display 120 included in the display system 100. However, the characteristics of each of the displays 120 may vary. For example, the display 120(A) could have a height of 640 pixels, and a width of 1920 pixels. Accordingly, the aspect ratio of the display 120(A) would be 3:1. By contrast, the display 120(B) could have a vertical resolution of 900 pixels, and a horizontal resolution of 1600 pixels. Consequently, the aspect ratio of the display 120(B) would be approximately 1.8:1. In a conventional collaboration system, because the aspect ratio of the display 120(A) is much larger than the aspect of the aspect ratio of the display 120(B), the appearance of each of the digital assets 582 included in the workspace could be stretched on the display 120(A) relative of the appearance of the digital asset on the display 120(B). For example, a particular digital asset 582 could appear as a square on the display 120(A) and as a rectangle on the display 120(B).

Further, if the content that makes up a particular digital asset 582 includes reflowable content, then the content that makes up the digital asset 582 may vary across the displays 120. As referred to herein, a "reflowable asset" is a digital asset 582 that is made up of or includes reflowable content. An example of reflowable content is a HyperText Markup Language (HTML) text, where the instructions of controlling the character rendering and line breaks of the content is a function of the resolution of the display 120, rendering application, and the size of the viewport window 560. Typically, the reflowable digital asset 582 includes a rendering engine that adapts the reflowable content included in the digital asset 582 to the application rendering environment. In conventional collaboration systems, the reflowable digital asset 582 is determined by the extent of the reflowable content displayed on the display 120 based on the size of the container associated with the digital asset 582, the aspect ratio of the display 120, and/or the resolution of the display 120.

For example, suppose that a particular digital asset 582 that included a spreadsheet were to lie completely within the viewport windows 160(A) and 160(B) of the displays 120 (A) and 120(B). Further, suppose that the aspect ratios, vertical resolution, and/or horizontal resolution of the displays 120(A) and 120(B) were not equal. In such a scenario, in a conventional collaboration system, the number of rows and/or columns displayed via the display 120(A) would differ from the number of rows and/or columns displayed via the display 120(B).

In general, such inconsistency in the appearances of the digital assets 582 to different users in a collaboration can reduce the overall quality of the collaboration for some or all of the users. Further, such inconsistencies may even inhibit the ability of users who see particularly "stretched" versions of shared digital assets 582 and/or less reflowable content relative to other users from being able to participate effectively in the collaboration. For this reason, the collaboration engines 550 are configured to ensure that the appearance of the digital assets 582 is consistent across the displays 120, that is the content rendered within the viewport windows 560 of the two distinct displays 120 would be the same for both.

To synchronize the displays 120, each appliance 140 may send messages to other appliances 140 that are sharing the same project via the messaging infrastructure 240. For example, an appliance 140 may send a message indicating the size and/or position of a particular digital asset 582 within the scaled workspace 580 that is currently displayed in its viewport window 560 to the other appliances 140 (via the messaging infrastructure 240) whenever the size and/or position of the digital asset 582 currently displayed in its viewport window 560 is changed. The collaboration engine 550 of each of the appliances 140 receiving this message may then update the size and/or position of the digital asset 582 within the associated scaled workspace 580 accordingly.

Displaying Shared Assets Consistently Across Displays

As shown, three of the display systems 100 are configured, via the collaboration engine 550, to share a workspace. Notably, the appearances of the digital assets 582 within the scaled workspaces 580 are consistent across the displays 120 included in the display systems 100. In particular, the digital asset 582(1) appears square and the digital asset 582(2) appears rectangular to all the users, irrespective of the display 120 via which each user is viewing the digital assets 582. Further, the spatial integrity of the digital assets 582 within the different scaled workspaces 580 is consistent across the displays 120. This consistent spatial integrity is illustrated by the horizontal orientation and separation of the digital assets 582(1) and 582(2) within the scaled workspaces 580.

In operation, the collaboration engine 550 continually configures each of the display systems 100 that share the digital assets 582 based on interactions with the scaled workspaces 280. The interactions may be initiated via any of the display systems 100 that share the workspace 580. Upon receiving a change (addition, relocation, etc.) to the digital asset 582 via a particular display system 100, the collaboration engine 260 ensures that the digital asset 582 is displayed consistently across all the display systems 100.

Figure 6:
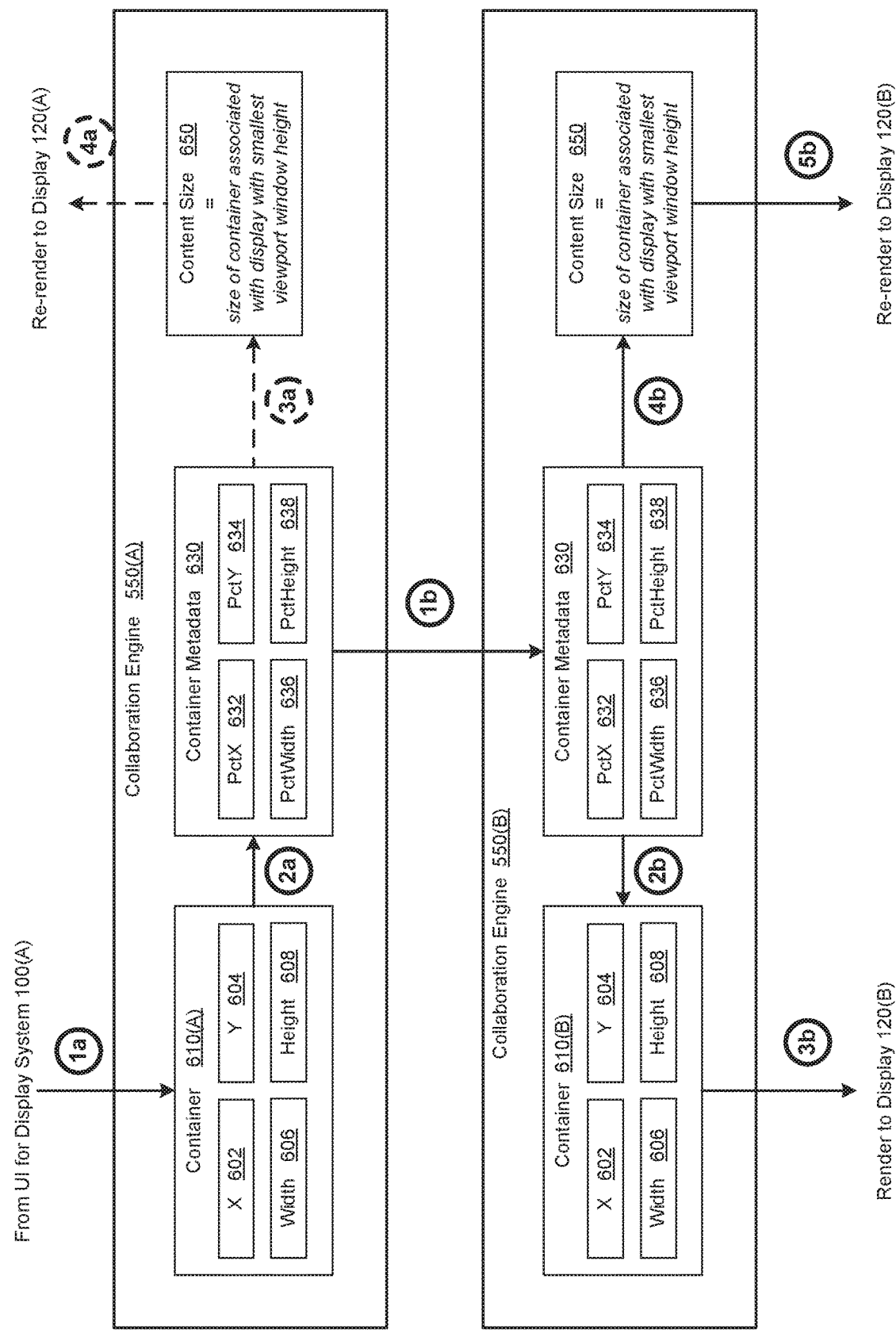
FIG. 6 is a more detailed illustration of how the collaboration engines of FIG. 5 display a shared digital asset, according to various embodiments of the present invention.

FIG. 6 is a more detailed illustration of how the collaboration engines 550 of FIG. 5 display a shared digital asset 582, according to various embodiments of the present invention. For explanatory purposes, two sequences of event are labeled using numbered circles. The events commence when a user adds the digital asset 582 to the scaled workspace 580(A) via the client application 142(A) included in the display system 100(A). To display the digital asset 582 on the display 120(A), the collaboration engine 550(A) executes the events labeled 1a-4a. To display the digital asset 582 on the display 120(B), the collaboration engine 550(B) executes the events labeled 1b-5b. For explanatory purposes, the context of FIG. 5 includes only the two collaboration engines 550(A) and 550(B). However, as persons skilled in the art will recognize, in alternate embodiments any number of additional collaboration engines 550 may execute events similar the events labeled 1b-5b to display the digital asset 582 on any number of additional displays 120.

First, as the circle labeled "1a" depicts, the collaboration engine 550(A) receives a container 610(A) in which the asset 582 is displayed within the shared workspace 580(A) on the display 120(A). The container 610(A) may be generated in any technically feasible fashion. For example, a user interface associated with the display system 100(A) may generate the container 610(A) based on user input. The container 610(A) specifies the placement and size of the digital asset 582 within the scaled workspace 580(A) that is displayed via the display 120(A).

In general, each container data 610 is associated with a particular digital asset 582 and a particular scaled workspace 580. The container data 610 includes, without limitation, an X 602, a Y 604, a width 606, and a height 608. The X 602 and the Y 604 specify, respectively, a horizontal and a vertical location of the digital asset 582 within the scaled workspace 580. The width 606 and the height 608 specify, respectively, the width and the height of the digital asset 582 within the scaled workspace 580. The X 602, the Y 604, the width 606, and the height 608 are expressed in pixels.

The horizontal and vertical location of the digital asset 582 may correspond to any predetermined point on the digital asset 582, such as the location of the upper left corner of the digital asset 582. The horizontal location is a coordinate of the location of the digital asset 582 along an x-axis (horizontal axis) within the associated scaled workspace 580. The vertical location is a coordinate of the location of the digital asset 582 along a y-axis (vertical axis) within the associated scaled workspace 580. In alternate embodiments, the container 610 may indicate the location and size of the associated digital asset 582 within the associated scaled workspace 580 in any technically feasible fashion and based on any coordinate system.

As the circle labeled "2A" depicts, the collaboration engine 550(A) then computes container metadata 630 associated with the digital asset 582. The container metadata 630 expresses the location and size of the digital asset 582 in percentage values within the associated scaled workspace 580. As shown, the container metadata 330 includes, without limitation, a percentage X (PcyX) 632, a percentage Y (pctY) 634, a percentage width (pctWidth) 636, and a percentage height (pctHeight) 638. The percentage X 632 and the percentage width 636 express, respectively, a horizontal location and width of the digital asset 582 as percentages of the width of the associated scaled workspace 580. The percentage Y 634 and the percentage height 638 express, respectively, a vertical location and height of the digital asset 582 as percentages of the height of the associated scaled workspace 580.

In general, the collaboration engine 550(A) computes the container metadata 630 based on the container 610(A) and the size of the scaled workspace 580(A). More precisely, the collaboration engine 550(A) divides the X 602 of the container 610(A) by the width of the scaled workspace 580(A) to determine the pctX 632. The collaboration engine 550(A) divides the Y 604 of the container 610(A) by the height of the scaled workspace 580(A) to determine the pctY 334. The collaboration engine 550(A) divides the width 606 of the container 610(A) by the width of the scaled workspace 580(A) to determine the pctWidth 636. Finally, the collaboration engine 550(A) divides the height 608 of container 610(A) by the height of the scaled workspace 580(A) to determine the pctHeight 638. In this fashion, the container metadata 630 expresses the location and size of the digital asset 582 as percentages of the scaled workspace 580(A).

As the circle labeled "1b" depicts, after computing the container metadata 630, the collaboration engine 550(A) transmits the container metadata 630 to the collaboration engine 550(B). As a general matter, the collaboration engines 550 may exchange information, including the container metadata 630, in any technically feasible fashion. In some embodiments, the collaboration engines 550 receive workspace information and one or more message objects from the communication infrastructure 210 and store the workspace information and message objects locally to memory or storage. In response to requests from each of the collaboration engines 550, the various servers of the streaming infrastructure 230 (such as the collaboration server 310, the database server 320, and the file server 330) may work in conjunction to transmit and receive workspace information to synchronize such information between the collaboration engines 550.

As the circle labeled "2b" depicts, after receiving the container metadata 630, the collaboration engine 550(B) computes the container 610(B). The container 610(B) specifies the placement and size of the digital asset 582 within the scaled workspace 580(B) that is displayed via the display 120(B). To ensure that the digital asset 582 is placed in a consistent fashion within the scaled workspaces 580(A) and 580(B), the collaboration engine 550(B) computes the container 610(B) based on the container metadata 630.

More specifically, to compute the container 610(B), the collaboration engine 550(B) performs a series of multiplication operations. The collaboration engine 550(B) performs a multiplication operation between the percentage X 632 included in the container metadata 630 and the width of the scaled workspace 580(B) to compute the X 602 of the container 610(B). The collaboration engine 550(B) performs a multiplication operation between the percentage Y 634 included in the container metadata 630 and the height of the scaled workspace 580(B) to compute the Y 604 of the container 610(B). The collaboration engine 550(B) performs a multiplication operation between the percentage width 636 included in the container metadata 630 and the width of the scaled workspace 580(B) to compute the width 606 of the container 610(B). Finally, the collaboration engine 550(B) performs a multiplication operation between the percentage height 638 included in the container metadata 630 and the height of the scaled workspace 580(B) to compute the height 608 of the container 610(B).

Because the collaboration engine 550(B) computes the container 610(B) based on the container metatdata 330 that is derived from the container 610(A), the containers 610(B) and 610(A) correlate with each other. Further, as described previously herein, the aspect ratio of the scaled workspace 580(B) matches the aspect ratio of the scaled workspace 580(A). Consequently, the computations performed by the collaboration engines 550 maintain the location and size of the digital asset 582 relative to the other digital assets 582 across all the displays 120.

As persons skilled in the art will recognize, the digital asset 582 is automatically rendered to the display 120(B) based on the container 610(B). As a general matter, an external rendering engine may be configured to execute rendering operations in response to any change in the asset 582, including the addition of the asset 582 and any change in the container 610. In operation, as the asset 582 is manipulated by any of the users via any of the shared workspaces 580, the collaboration engines 550 update the containers 610 and the asset 582 is displayed on the displays 120.

Consequently, as the circle labeled "3b" depicts, the digital asset 582 is displayed on the display 120(B) based on the container 610(B). Initially, the digital asset 582 is displayed using default rendering options. If the digital asset 582 is not made up of any reflowable content, then displaying the digital asset 582 on the display 120(B) in this fashion ensures that the digital asset 582 is displayed consistently across the displays 120(A) and 120(B). Consequently, if the digital asset 582 is not made up of any reflowable content, then the collaboration engines 550 have finished sharing the digital asset 582 and do not perform the optional events depicted as the circles labeled 3a, 4a, 4b, and 5b.

However, if the digital asset 582 is made up of any reflowable content, then the reflowable content may not yet be displayed consistently across the displays 120(A) and 120(B). For example, the default rendering option for reflowable content is to determine the amount of reflowable content based on the container 610. As referred to herein, the "amount" of content is the quantity of data that makes up the rendered digital asset 582. For example, the amount can be the number of byes of data making up the rendered digital asset 582. Operating using the default rendering option, if the digital asset 582 is made up of any reflowable content, then the external rendering engine computes and renders an amount of reflowable content based on the width 606 and the height 608 of the container 610(B). The external rendering engine then displays the digital asset 582, including any rendered reflowable content, at the location and size specified by the container 610(B).

[ono] Accordingly, operating under the default rendering option for reflowable content, the amount of any reflowable content that makes up the digital asset 582 may vary across the displays 120(A) and 120(B). Because such inconsistency may hinder the ability of users to effectively collaborate, if the digital asset 582 is made up of any reflowable content, then the collaboration engines 550(A) and 550(B) perform additional operations to ensure that the amount of any reflowable content that makes up the digital asset 582 is consistent across the displays 120(A) and 120(B). The collaboration engines 550 may determine whether the digital asset 582 is made up of any reflowable content in any technically feasible fashion.

If the digital asset 582 is made up of any reflowable content, then the collaboration engine 550(A) and 550(B) individually determine a "constraining" display 120 that is associated with the viewport window 560 with the smallest height. More precisely, the collaboration engines 550 individually compare the height of the viewport windows 560(A) and 560(B) and set the constraining display 120 equal to the display 120 that is associated with the viewport window 560 having the smallest height (in pixels). For example, if the height of the viewport window 560(A) is less than or equal to the height of the viewport window 560(B), then the collaboration engines 550A and 550B set the constraining display 120 equal to the display 120(A). By contrast, if the height of the viewport window 560(A) is greater than the height of the viewport window 560(B), then the collaboration engines 550A and 550B set the constraining display 120 equal to the display 120(B).

Subsequently, for each of the non-constraining displays 120, the associated collaboration engine(s) 550 independently compute a content size 650 for rendering the reflowable content. The content size 650 includes a width and height of reflowable content that makes up the digital asset 582. Although the collaboration engines 550 compute the content size 650 individually, the collaboration engines 550 implement similar algorithms and, consequently, compute the same values for the content size 650. In particular, the associated collaboration engines 550 are configured to compute the content size 650 as the size of the container 610 associated with the constraining display 120. Notably, the constraining display 120 already displays the reflowable content that makes up the digital asset 582 at the content size 650 and, consequently, the collaboration engine 550 associated with the constraining display 120 has finished performing asset sharing operations.

For explanatory purposes only, in the context of FIG. 6, the constraining display 120 is the display 120(A). Accordingly, after determining that the constraining display 120 is the display 120(A), the collaboration engine 550(A) has finished performing asset sharing operations. Although the collaboration engine 550(A) does not perform the events depicted with the dashed circles labeled 3a and 4a, the display 120(B) displays the digital asset 582(s) in the desired fashion. By contrast, as depicted with the circle labeled 4b, the collaboration engine 550(B) computes the content size 650 based on the container metadata 630 and the width and height of the scaled workspace 580 associated with the constraining display 120.

To compute the content size, the collaboration engine 550(B) performs two multiplication operations. The collaboration engines 550(B) performs a multiplication operation between the percentage width 636 included in the container metadata 630 and the width of the scaled workspace 580(A) associated with the constraining display 120(A) to compute the width of the content size 650. The collaboration engine 550(B) then performs a multiplication operation between the percentage height 638 included in the container metadata 630 and the height of the scaled workspace 580(A) associated with the constraining display 120(A) to compute the height of the content size 650.

After computing the content size 650, for each of the displays 120 other than the constraining display 120, the associated collaboration engine 550 transmits the content size 650 to the external rendering engine to override the default amount of reflowable content to render. For each of the non-constraining displays 120, the external rendering engine then re-renders the reflowable content based on the content size 650 and the container 610 associated with the non-constraining display 120 in any technically feasible fashion.

More specifically, as depicted by the circle labeled "5b," the collaboration engine 550(B) transmits the content size 650 to the external rendering engine to override the default amount of reflowable content to render to the display 120(B). The external rendering engine then re-renders the reflowable content based on the content size 650 and the container 610(B) to the display 120(B). For example, suppose that the size of the container 610(A) within which the asset 582 is displayed on the display 120(A) were to be 400×400. Further, suppose that the size of the container 610(B) within which the asset 582 is displayed on the display 120(B) were to be 800×800. In such a scenario, the collaboration engine 550(B) would compute the content size to be 400×400. The collaboration engine 550(B) could set a rendering control via an application programming interface (API) included in the external rendering engine. The rendering control could configure the external rendering engine to render the asset 582 as if the container 610(B) were 400×400 and then scale the rendering to fit the actual 800×800 size of the container 610(B). In this fashion, the content size 650 ensures that the appearance of the asset (including the reflowable content) is consistent across the displays 120(A) and 120(B).

Note that the techniques described herein are illustrative rather than restrictive, and may be altered without departing from the broader spirit and scope of the invention. As a general matter, the techniques outlined herein are applicable to facilitating the consistent appearance of any number of the digital assets 582 across any number of the displays 120 based on any number of deterministic parameters. Further, in some embodiments, one or more of the techniques may be implemented while one or more of the other techniques my be omitted. For example, in some embodiments, the collaboration engine 550 may not adjust the amount of reflowable content that makes up the digital assets 582 across the displays 120. Further, the techniques may be modified and implemented across any number of software and hardware units in any combination.

Figure 7:
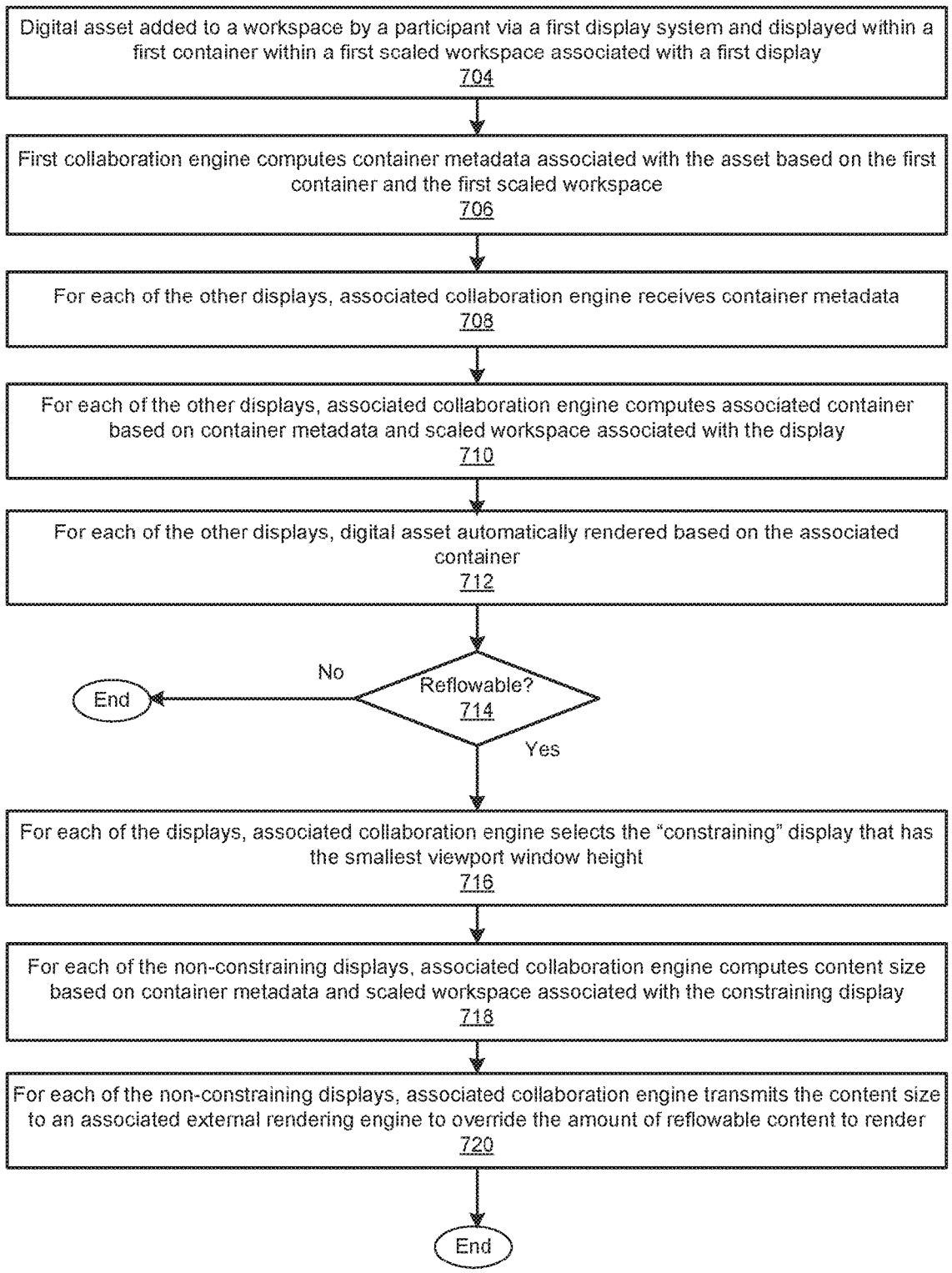
FIG. 7 is a flow diagram of method steps for displaying a shared digital asset across multiple displays, according to various embodiments of the present invention.

FIG. 7 is a flow diagram of method steps for displaying a shared digital asset across multiple displays, according to various embodiments of the present invention. Although the method steps are described with reference to the systems of FIGS. 1-6, persons skilled in the art will understand that any system configured to implement the method steps, in any order, falls within the scope of the present invention. For example, in some embodiments the collaboration engine 550 may implement the method steps to share any number of the digital assets 582 included in any number of workspaces across any number of the display systems 100 in any combination.

As shown, a method 700 begins at step 704, where the digital asset 582 is added to a first scaled workspace 580 by a user via a first display system 100. For example, a user could use a mouse included in the display system 100(3) to add the digital asset 582 to the scaled workspace 580(3) displayed on the display 120(3) included in the display system 100(3). As described previously herein, the first container 610 comprises the presentation window within which the asset is displayed on the first display 120. The location and size of the first container 610 is expressed in pixels relative to the first scaled workspace 580.

At step 706, a first collaboration engine 550 associated with the first display system 100 computes the container metadata 630 that is associated with the digital asset 582. In general, the first collaboration engine 550 computes the container metadata 630 based on the first container 610 and the size of the first scaled workspace 580. More precisely, the first collaboration engine 550 divides the X 602 of the first container 610 by the width of the first scaled workspace 580 to determine the pctX 632. The first collaboration engine 550 divides the Y 604 of the first container 610 by the height of the first scaled workspace 580 to determine the pctY 634. The first collaboration engine 550 divides the width 606 of the first container 610 by the width of the first scaled workspace 580 to determine the pctWidth 636. Finally, the first collaboration engine 550 divides the height 608 of first container 610 by the height of the first scaled workspace 580 to determine the pctHeight 688. In this fashion, the container metadata 630 expresses the location and size of the digital asset 582 as percentages of the scaled workspace 580.

At step 708, for each of the other display systems 100, the associated collaboration engine 550 receives the container metadata 630. The collaboration engines 550 may exchange information, including the container metadata 630, in any technically feasible fashion. In some embodiments, the collaboration engines 550 receive workspace information and one or more message objects from the communication infrastructure 210 and store the workspace information and message objects locally to memory or storage. In response to requests from each of the collaboration engines 550, the various servers of the streaming infrastructure 230 (such as the collaboration server 310, the database server 320, and the file server 330) may work in conjunction to transmit and receive workspace information to synchronize such information between the collaboration engines 550.

As discussed above, each workspace may have an assigned aspect ratio, one or more associated scaled workspaces 580, one or more associated viewport windows 560, and one or more assets 582. The returned workspace information may include files for the asset content (such as documents, images, and videos) of all assets associated with the project. The workspace information may also include metadata, such as the container metadata 610 specifying the location/position and dimensions/size of each of the digital assets 582 within its associated scaled workspace 580 expressed in percentage values. Further, the workspace information may include the dimensions of all the scaled workspace 580 and all the viewport windows 560.

At step 710, for each of the other display systems 100, the associated collaboration engine 550 computes the container 610 within which the digital asset 582 is displayed on the associated display 120. The location and size of each of the containers 610 is expressed in pixels. For example, the collaboration engine 550($x$) computes the container 610($x$) within which the digital asset 582 is displayed on the display 120($x$). In general, the collaboration engine 550 computes the container data 610 based on the container metadata 630 and the size of the associated scaled workspace 580 in pixels. For example, the collaboration engine 550($x$) computes the container 610($x$) within which the digital asset 582 is displayed on the display 120($x$) based on the container metadata 630 and the size of the scaled workspace 580(x) that is displayed on the display 120(x). In this fashion, the container 610(x) specifies the placement and size of the digital asset 582 within the scaled workspace 580(x).

More specifically, to compute a second "other" container 610, the second collaboration engine 550 performs a series of multiplication operations. The second collaboration engine 550 performs a multiplication operation between the percentage X 632 included in the container metadata 630 and the width of the second scaled workspace 580 to compute the X 602 of the second container 610. The second collaboration engine 550 performs a multiplication operation between the percentage Y 634 included in the container metadata 630 and the height of the second scaled workspace 580 to compute the Y 604 of the second container 610. The second collaboration engine 550 performs a multiplication operation between the percentage width 636 included in the container metadata 630 and the width of the second scaled workspace 580 to compute the width 606 of the second container 610. Finally, the second collaboration engine 550 performs a multiplication operation between the percentage height 638 included in the container metadata 630 and the height of the second scaled workspace 580 to compute the height 608 of the second container 610. For each of the displays 120 except the first display 120 (i.e., "source" display), the associated collaboration engine 550 performs such a series of multiplication operations to compute a different container 610.

At step 712, for each of the other displays 120, the digital asset 582 is automatically rendered based on the associated container 610. As a general matter, an external rendering engine may be configured to execute rendering operations in response to any change in the asset 582, including the addition of the asset 582 and any change in the container 610. In operation, as the asset 582 is manipulated by any of the users via any of the shared workspaces 580, the collaboration engines 550 execute steps 704-712 to update the containers 610 and the asset 582 is displayed on each of the displays 120 according to the associated container 610.

Notably, at step 712, the digital asset 582 is initially displayed based on default rendering options. For example, the default rendering option for reflowable content is to determine the amount of reflowable content based on the container 610. More specifically, by default and for each of the displays 120, the external rendering engine is configured to compute and render an amount of reflowable content based on the width 606 and the height 608 of the container 610 associated with the display 120. Accordingly, operating under the default rendering option for reflowable content, the amount of any reflowable content that makes up the digital asset 582 may vary across the displays 120.

At step 714, each of the collaboration engines 550 (including the collaboration engine 550 associated with the first "source" display 120) individually determines whether the digital asset 582 is made up of any reflowable content. Each of the collaboration engines 550 may determine whether the digital asset 582 is made up of any reflowable content in any technically feasible fashion. If, at step 714, the collaboration engines 550 determine that the digital asset 582 is not made up of reflowable content, then the method 700 terminates. Because all the containers 610, including the first container 610, correlate to the container metadata 630, the appearance of the digital asset 582 is consistent across the displays 120.

If, however, at step 714, the collaboration engines 550 determine that the digital asset 582 is made up of reflowable content, then the method 700 proceeds to step 716. At step 716, each of the collaboration engines 550 determines the "constraining" display 120 that is associated with the viewport window 560 having the smallest height. More precisely, the collaboration engines 550 individually compare the height of the viewport windows 560 associated with all the displays 120 and select the constraining display 120 as the display 120 that is associated with the viewport window 560 having the smallest height (in pixels). The collaboration engines 550 may compare the viewport windows 560 to determine which of the viewport windows 560 has the smallest height in any technically feasible fashion.

At step 718, for each of the displays 120 other than the constraining display 120, the associated collaboration engine 550 computes the content size 650 associated with the digital asset 582. Each of these collaboration engine 550 computes the content size 650 based on the container metadata 630 and the size of the scaled workspace 580 associated with the constraining display 120. To compute the content size 650, each of the collaboration engines 550 performs two multiplication operations. The collaboration engines 550 perform a multiplication operation between the percentage width 636 included in the container metadata 630 and the width of the scaled workspace 580 associated with the constraining display 120 to compute the width of the content size 650. The collaboration engines 550 perform a multiplication operation between the percentage height 638 included in the container metadata 630 and the height of the scaled workspace 580 associated with the constraining display 120 to compute the height of the content size 650. In this fashion, each of the collaboration engines 550 that is not associated with the constraining display 120 computes the same content size 650. Further the content size 650 matches the size of the container 610 associated with the constraining display 120.

At step 720, for each of the displays 120 other than the constraining display 120, the associated collaboration engine 550 transmits the content size 650 to the external rendering engine to override the default amount of reflowable content to render. For each of the non-constraining displays 120, the external rendering engine then re-renders the reflowable content based on the content size 650 and the container 610 associated with the display 120 in any technically feasible fashion. For example, suppose that the size of the container 610(x) within which the asset 582 is displayed on the display 120(x) were to be 800×800. Further, suppose that the content size 650 were to be 400×400. In such a scenario, the collaboration engine 550(x) could set a rendering control via an application programming interface (API) included in the external rendering engine. The rendering control could configure the external rendering engine to render the asset 582 as if the container 610(x) were 400×400 and then scale the rendering to fit the actual 800×800 size of the container 610(x).

As persons skilled in the art will recognize, the content size 650 ensures that the appearance of the asset (including the reflowable content) is consistent across the displays 120. Further, the constraining display 120 is already displaying the amount of content based on the associated container 610 that matches the content size 650. Consequently, the constraining display 120 does not need to perform steps 716-720 to ensure that the digital asset 582 is displayed in a consistent fashion across the displays 120. By contrast, if the first "source" display 120 is not the constraining display 120, then the first collaboration engine 550 is one of the collaboration engines 550 that performs step 716-720 to ensure that the digital asset 582 is displayed in a consistent fashion across the displays 120. The method 700 then terminates.

As a general matter, the method steps described herein may be modified to ensure that the digital assets 582 are displayed in a consistent manner across the displays 120 in response to any modification that may impact the digital assets 582. Such modifications may include re-positioning or re-sizing the digital asset 582, re-sizing the scaled workspaces 580, re-sizing the viewport windows 560, new displays 120 entering the collaboration, displays 120 exiting the collaboration, etc.

For example, when the digital asset 582 is re-positioned or re-sized on the display 120(B), the collaboration engines 120 may execute steps 406-420 to ensure that the appearance of the digital asset 582 is updated in a consistent manner across the displays 120. In another example, if a new user joins the collaboration via a new display system 100, then all the other collaboration engines 550 exchange synchronizing information with the collaboration engine 500 associated with the new display system 100. Such information may include the height of the viewport windows 560, the size of the scaled workspaces 580, the container metadata 630, etc. In response, the collaboration engines 550 may perform steps 406-420 to re-render any number of the digital assets 582.

Figure 8:
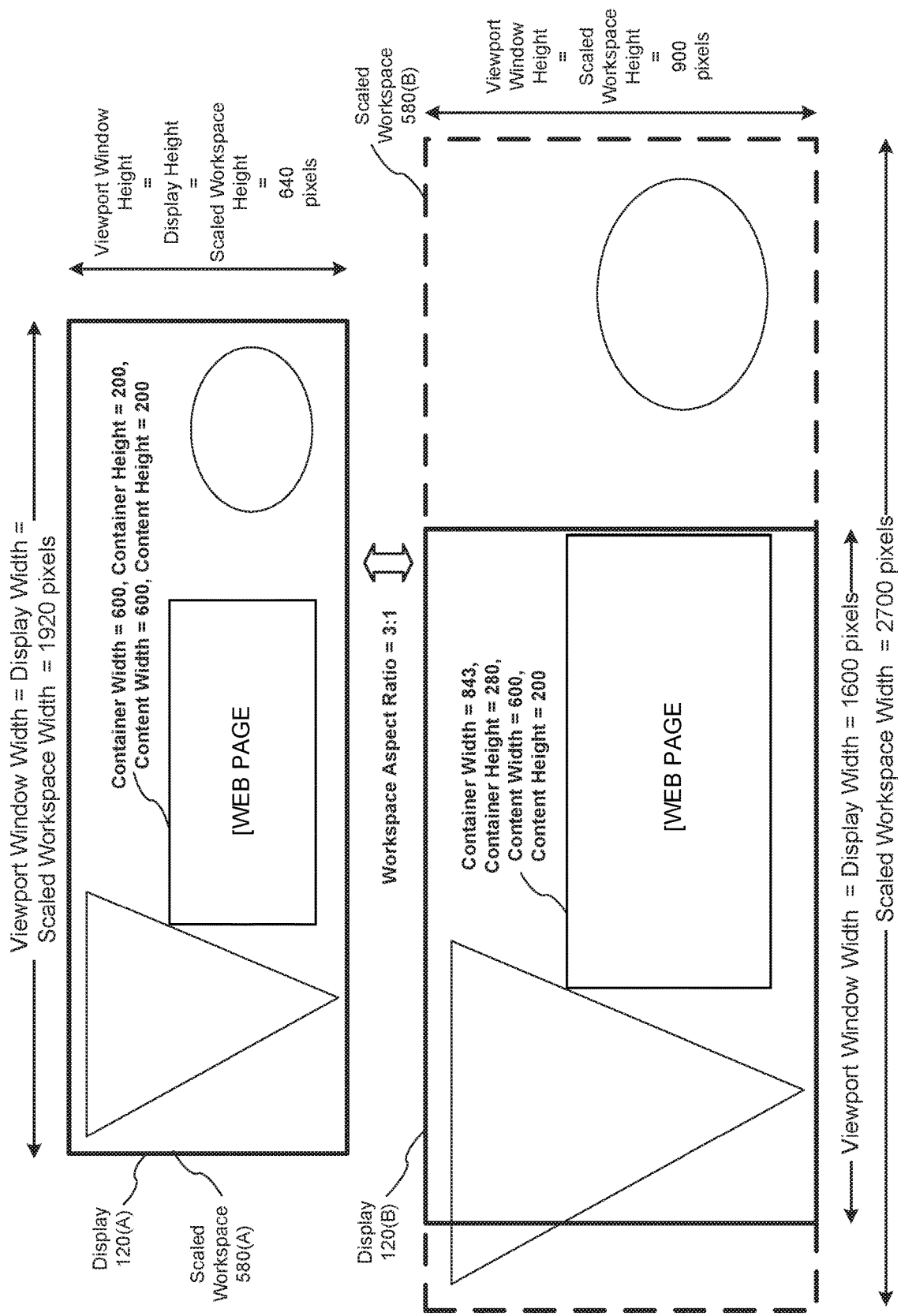
FIG. 8 is an example of how digital assets are positioned and displayed within a workspace that is shared across the displays of FIG. 5, according to various embodiments of the present invention.

FIG. 8 is an example of how digital assets 582 are positioned and displayed within a workspace that is shared across the displays 120 of FIG. 5, according to various embodiments of the present invention. The context of FIG. 8 is that the display systems 100(A) and 100(B) share a workspace across the two displays 120(A) and 120(B). The display system 100(A) displays the scaled workspace 580(A) associated with the display system 100(A) in the static viewport window 160(A) that corresponds to the entire display screen of the display 120(A). The display system 100(B) displays the scaled workspace 580(B) associated with the display system 100(B) in the static viewport window 560(B) that corresponds to the entire display screen of the display 120(B). The assigned workspace aspect ratio is 3:1.

The display 120(A) has a height of 640 pixels and a width of 1920 pixels. Consequently, the aspect ratio of the display 120(A) is 3:1 and matches the assigned workspace aspect ratio. The height of the scaled workspace 580(A) matches the height of the display 120(A). The width of the scaled workspace 580(A) is the product of the height of the scaled workspace 580(A) and the assigned workspace aspect ratio. Accordingly, the dimensions of the scaled workspace 580(A) match the dimensions of the display 120(A).

By contrast, the display 120(B) has a height of 900 pixels and a width of 1600 pixels. Consequently, the aspect ratio of the display 120(B) is approximately 1.8:1 and is smaller than the assigned workspace aspect ratio. The height of the scaled workspace 580(B) matches the height of the display 120(B). The width of the scaled workspace 580(B) is the product of the height of the scaled workspace 580(B) and the assigned workspace aspect ratio. Accordingly, the height of the scaled workspace 580(B) is 900 pixels and matches the height of the display 120(B). However, the width of the scaled workspace 580(B) is 2700 pixels and exceeds the width of the display 120(B).

Because the horizontal extent of the scaled workspace 580(B) exceeds the horizontal extent of the display 120(B), only a horizontal subset of the scaled workspace 580(B) is visible via the display 120(B) at any given time. The display system 120(B) may implement any number and type of navigation techniques to enable users to view the entire scaled workspace 580(B) via the display 120(B). For example, the display system 120(B) may provide scroll bars that enable users to execute horizontal panning operations.

As shown, the workspace includes the three digital assets 582. The three digital assets 582 include a triangle, an oval, and a webpage. The collaboration engines 550(A) and 550(B) ensure the spatial integrity of the digital assets 582 across the scaled workspace 580. For example, the oval appears as an oval to all the users in the collaboration and does not appear stretched or compressed to any of the users. Further, for all the users, the distance between the triangle and the webpage appear much smaller than the distance between he webpage and the oval. However, at the time depicted, all three of the digital assets 582 are fully visible via the display 520(A) while only a portion of the triangle, the entire webpage, and none of the oval are visible via the display 520(B).

Neither the triangle nor the oval is made up of reflowable content. By contrast, the webpage is made up of reflowable content. Because the webpage is made up of reflowable content, the collaboration engines 550(A) and 550(B) also configure the display systems 100(A) and 100(B) to render the same amount of webpage content. As previously described herein, the collaboration engines 550(A) and 550(B) compare the heights of the viewport window 560(A) and 560(B) and set the "constraining" display 120 to the display 120 that is associated with the viewport window 560 that has the smallest height.

Since the height of the viewport window 560(A) is 640 pixels and the height of the viewport window 560(B) is 900 pixels, the collaboration engines 550(A) and 550(B) determine that the constraining display is the display 120(A). As described previously herein, because the collaboration engine 550(B) is not the constraining display 120, the collaboration engine 550(B) computes the content size 650. The collaboration engine 550(B) performs a multiplication operation between the percentage width 636 included in the container metadata 630 associated with the webpage and the width of the scaled workspace 680(A) to compute the width included in the content size 650. Similarly, the collaboration engine 550(B) performs a multiplication operation between the percentage height 638 included in the container metadata 630 associated with the webpage and the height of the scaled workspace 680(A) to compute the height included in the content size 650. As a result, the content size 650 matches the size of the container 610(A) within which the webpage is displayed on the display 120(A).

As depicted, the size of the container 610(A) is 600×200. Consequently, the content size 650 is also 600×200. The external rendering engine renders the webpage to the display 120(A) based on the default rendering option of determining the amount of reflowable content based on the container 610(A). By contrast, the size of the container 610(B) is 843×280. If the external rendering engine were to render the webpage to the display 120(B) based on the default rendering option of determining the amount of reflowable content based on the container 610(B), then the display 120(B) would display more of the webpage than the display 120(A).

For this reason, the collaboration engine 550(B) configures the external rendering engine to determine the amount of reflowable content to render to the display 120(B) based on the content size 650 of 600×200. As part of rendering to the display 120(B), the external rendering engine then scales the amount of reflowable content to fill the container 610(B). In this fashion, as shown, the extent of the content included in the webpage and displayed via the display 120(B) matches the extent of the content included in the webpage and displayed via the display 120(A).

In sum, collaboration engines work together to configure computer-based devices to display digital assets within a shared workspace in a consistent manner. The context of the collaboration is that each display system displays a different scaled workspace on a different display. The aspect ratios of the different displays may vary across the displays. However, the aspect ratio of each of the different scaled workspaces matches a workspace aspect ratio associated with the workspace. Each of the collaboration engines is associated with a different display system.

Together, the collaboration engines ensure that the spatial integrity of the digital assets within the shared workspace is consistent across the displays. More specifically, when a digital asset is added or modified via a "source" display system, the "source" collaboration engine associated with the source display system computes percentage-based container metadata. The source collaboration engine computes the container metadata based on a scaled workspace associated with the source display system and a container that specifies the placement of the digital asset within this scaled workspace. Subsequently, for each of the other display system, the associated collaboration engine computes a display-specific container based on size of the scaled workspace associated with the display system and the container metadata.

For any digital assets that include reflowable content, the collaboration engines configure the display systems to render the reflowable content in a consistent fashion. In operation, each of the collaboration engines identifies a constraining display system as the display system that includes the viewport window having the smallest height. The collaboration engines associated with the non-constraining display systems then compute a content size to match the size specified by the container associated with the constraining display system. Finally, for each of the non-constraining display systems, the associated collaboration engine configures the display system to render the digital asset within the scaled workspace associated with the display system based on the container data associated with the display system and the content size. As a result, the amount of rendered content that makes up a particular digital asset is homogeneous across the displays.

At least one advantage of the disclosed techniques is that, during a presentation of a shared workspace, the users partake in a substantially similar viewing experience. Because the spatial integrity and content of digital assets within the shared workspace is consistent across the displays, users may collaborate in a coordinated fashion. By contrast, the appearance of digital assets in conventional collaboration systems may vary across displays and, consequently, hinder the ability of the users to effectively work together.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors or gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

The invention claimed is:

1. A system for sharing a digital asset across a plurality of displays, the system comprising:

means for receiving container metadata that is generated in response to a digital asset having a first size being placed at a first location within a first scaled workspace that is displayed, at least in part, on a first display coupled to a first device, wherein the digital asset includes reflowable content;

means for computing, based on the container metadata and a size associated with a second scaled workspace that is displayed, at least in part, on a second display coupled to a second device, a second location within the second scaled workspace, and a second size for the digital asset, wherein the first location is located at a first percentage position within the first scaled workspace in a horizontal dimension and a second percentage position within the first scaled workspace in a vertical dimension, and the second location is located at the first percentage position within the second scaled workspace in the horizontal dimension and the second percentage position within the second scaled workspace in the vertical dimension;

means for determining that a first dimension of a first viewport window associated with the first display is less than a second dimension of a second viewport window associated with the second display;

means for computing a first amount of the reflowable content based on the first scaled workspace;

means for causing the second device to display the digital asset within the second scaled workspace at the second location and at the second size, wherein causing the second device to display the digital asset further comprises causing the second device to re-display the first amount of the reflowable content within the second scaled workspace at the second location and at the second size.

2. The system of claim 1, wherein the means for computing the second location comprises:

means for performing a multiplication operation between a percentage x coordinate included in the container metadata and a width of the second scaled workspace; and means for performing a multiplication operation between a percentage y coordinate included in the container metadata and a height of the second scaled workspace.

3. The system of claim 1, wherein the digital asset is associated with reflowable content, and further comprising:

means for determining that a first dimension of a first viewport window associated with the first display is less than a second dimension of a second viewport window associated with the second display;

means for computing a first amount of the reflowable content based on the first scaled workspace; and means for causing the second device to re-display the first amount of the reflowable content within the second scaled workspace at the second location and at the second size.

4. The system of claim 3, wherein the first dimension comprises a vertical resolution associated with the first display expressed in pixels.

5. The system of claim 1, wherein the digital asset is associated with reflowable content, and further comprising:

means for determining that a first dimension of a first viewport window associated with the first display is greater than a second dimension of a second viewport window associated with the second display;

means for computing a first amount of the reflowable content based on the second scaled workspace; and means for causing the first device to re-display the first amount of the reflowable content within the first scaled workspace at the first location and at the first size.

6. The system of claim 1, wherein a first aspect ratio associated with the second scaled workspace is different than a second aspect ratio associated with the second display.

7. The system of claim 1, wherein a first horizontal width associated with the first display is less than a second horizontal width associated with the first scaled workspace, and a horizontal portion of the digital asset is not visible via the first display.

* * * * *